3,579,583
PROCESS FOR PREPARATION OF
N-METHYL-ALKYL AMINES
Horst Rutzen, Dusseldorf-Holthausen, Germany, assignor to Henkel & Cie., G.m.b.H., Dusseldorf-Holthausen, Germany
No Drawing. Filed Dec. 9, 1968, Ser. No. 782,426
Claims priority, application Germany, Dec. 7, 1967, H 64,693
Int. Cl. C07c 85/12
U.S. Cl. 260—583
10 Claims

ABSTRACT OF THE DISCLOSURE

A new method of producing N-methyl-alkyl amines by hydrogenating a monocarboxylic acid or a dicarboxylic acid which will not form an internal anhydride at 200 to 400° C. in the presence of mono and/or dimethyl amine and an oxide catalyst.

PRIOR ART

Up to the time of the present invention, N-methyl alkyl amines have been prepared by reacting an amine with methyl halide or with formaldehyde or by hydrogenating carboxylic acid nitriles in the presence of formaldehyde or methanol. Direct preparation of N-methyl-alkyl amines from carboxylic acids has not previously been known.

OBJECTS OF THE INVENTION

It is an object of the invention to provide a novel method of producing N-methyl alkyl amines from carboxylic acids by hydrogenation in the presence of a methyl amine.

This and other objects and advantages of the invention will become obvious from the following detailed description.

THE INVENTION

The novel process of the invention for the preparation of N-methyl alkyl amines comprises hydrogenating an acid selected from the group consisting of dicarboxylic acids which will not form internal anhydrides under the reaction conditions and monocarboxylic acids at a temperature of 200 to 400° C. and a pressure of 50 to 400 atmospheres in the presence of an excess of at least one amine selected from the group consisting of monomethylamine and dimethylamine and methylamine formed in situ from methanol and ammonia and a metal oxide catalyst in lump form.

Instead of monomethylamine or dimethylamine, the amine can be formed in situ from methanol and ammonia. The methanol may at the same time act as a solvent for the carboxylic acid. Monomethylamine is preferred due to the high yield of monomethyl alkyl amines obtained. The amount of amine used in the reaction is a molar excess less than 20, preferably 2 to 5, times that based on the number of carboxylic acid groups present in the original reaction mixture.

The mixed metal catalyst in the oxide form contains zinc oxide admixed with at least one other metal oxide such as aluminum, chromium, titanium, vanadium, molybdenum or tungsten. Additionally, small amounts of other metal oxides such as barium, tin or cadmium may be present. The preferred catalysts are zinc-aluminum oxide and zinc-chromium oxide catalysts.

The said catalysts may be prepared by mixing the metal oxides or metal hydroxides or carbonates in a paste-like or suspended form and then drying in known way. The catalyst is used in lump form. The dry catalyst mixture may, for example, be broken into fragments, or, after grinding, if desired with addition of binders and/or graphite, be made into tablets. Before use, the catalyst may if desired be subjected to a careful reduction. This is necessary when oxides of transition metals in their highest state of valency are used for the preparation of the catalyst, such as chromium sesquioxide, which is reduced to the trivalent stage in the subsequent reduction treatment.

Suitable starting carboxylic acids are straight or branched chain, saturated or unsaturated aliphatic monocarboxylic acids with preferably 4 to 24 carbon atoms, such as butyric acid, valeric acid, isovaleric acid, capric acid, caproic acid, dipropylacetic acid, lauric acid, palmitic acid, stearic acid, oleic acid, linoleic acid, or behenic acid, etc.; cycloaliphatic monocarboxylic acids such as cyclopentanecarboxylic acid, cyclohexanecarboxylic acid, naphthenic acids, etc.; and mono- or poly-nuclear aromatic monocarboxylic acids such as benzoic acid, phenylacetic acid, diphenylmethanecarboxylic acid, naphthalenecarboxylic acids, etc.

Suitable dicarboxylic acids for starting substances in which no formation of an internal anhydride takes place under the reaction conditions aliphatic dicarboxylic acids such as glutaric acid, adipic acid, azelaic acid, sebacic acid, brassylic acid, octadecanedicarboxylic acid-(1,18), eicosanedicarboxylic-acid-(1,20); cycloaliphatic dicarboxylic acids such as cyclohexanedicarboxylic acid-(1,4); mono- and polynuclear aromatic dicarboxylic acids such as isophthalic acid, terephthalic acid, naphthalenedicarboxylic acid-(1,6) etc. The said mono- and di-carboxylic acids may be substituted by residues or groups which do not interfere with the reaction such as ether residues or amino groups.

Monocarboxylic acids or their mixtures obtained from natural fats are preferred starting materials for the process of invention. Examples of such carboxylic acids are lauric acid, myristic acid, palmitic acid, stearic acid, behenic acid, oleic acid or linoleic acid.

The carboxylic acids, together with mono- or dimethylamine or their components, methanol and ammonia, from which they are formed are fed continuously into the reaction apparatus. The reactants are preferably preheated to about 50° to 350° C. before being fed in to the apparatus. The preferred reaction conditions are 200 to 350° C. and a pressure of 100 to 300 atmospheres.

Technically pure hydrogen may be used for the hydrogenation and is preferably used in an excess of 50 to 500 times the quantity theoretically required. A portion of the hydrogen may be replaced by any gases which are inert under the reaction conditions. The hydrogen or the hydrogen-inert gas mixture is preferably used in a cyclic course. The quantity of gas circulated per hour is preferably 300 to 400 liters under pressure.

The advantages of the invention reside especially in that the N-methylated products of the mono- and di-amines have become available with good yields in a continuous process for large scale production. As a further particular advantage, relatively cheap carboxylic acids may be used as starting substances and the previously costly conversion of these carboxylic acids into primary amines or nitriles is not necessary. The possibility of the production of N-methylalkyl amines given by the process according to the invention is all the more surprising as it could not be expected that the intermediate stages occurring during the formation of such compounds from carboxylic acids, namely formation of salt and amide, would be carried out with a speed sufficient for a continuous process.

The products of the process may be used as flotation assistants, road-building assistants, agents for protection against corrosion and for the synthesis of surface-active products.

In the following examples there are described several preferred embodiments to illustrate the invention. However, it should be understood that the invention is not intended to be limited to the specific embodiments.

PREPARATION A

Zinc oxide-aluminum oxide catalyst 50 kg. of technical pulverulent zinc oxide and 50 kg. of aluminum hydroxide (crystalline form, bulk density 1275 g. per liter) were mixed with water in a kneader to form a stiff paste. The paste was dried at 80° C. and the solid cake formed was finely ground. After addition of 3% by weight of graphite, the powder was press-moulded into 4 mm. tablets.

PREPARATION B

Zinc oxide chromium oxide catalyst 81.4 kg. of technical pulverulent zinc oxide and 60 kg. of chromium sesquioxide were mixed in a kneader with water to form a stiff paste. The paste was dried at 80° C. and the solid cake formed was finely ground. The powder was mixed with 3% by weight of graphite and press-moulded into 6 mm. tablets. The catalyst so prepared was subjected to a reducing treatment for 50 hours in the hydrogenation apparatus described herein into which hydrogen was first introduced at 300° C. under a pressure of 40 atmospheres in a stream of nitrogen so slowly that the temperature did not rise above 350° C.

EXAMPLE I 12 liters of the zinc oxide-aluminum oxide catalyst of preparation A were placed in a known hydrogenation apparatus consisting of a heated 14 liter pressure oven, a gas circulating system, a condenser and a pressure separator for separating hydrogen and for depressurizing the reaction product. The tablets were heated to 310° C. in a hydrogen stream (240 atmospheres, 385 liters under pressure per hour). After this temperature was reached, 1 liter (850 g.) of 98.2% stearic acid and 400 g. of commercial monomethylamine, both preheated to 310° C., were fed hourly into the oven. About 1.2 liters of water-white reaction product were removed hourly from the pressure separator. A sample of this crude product was heated in a water jet vacuum up to the start of boiling in order to separate out lower amine. The AZ of the product so pretreated amounted to 203. It was then distilled over an 80 cm. saddle-shaped column to obtain 93% by weight fraction. The amine number of this distillate amounted to 203. The NMR spectrographic investigation of the distillate showed a content of 89% of N-methyl-octadecylamine and 11% of N,N-dimethyloctadecylamine.

The amine number (AZ) in combination with an NMR spectrographic investigation serves as proof of the formation of N-methyl-substituted alkylamines during the process. AZ represents the amount of potassium hydroxide in mg. which corresponds to the amount of hydrochloric acid consumed by 1 g. of amine during the formation of hydrochloride.

EXAMPLE II

Example I was repeated except that instead of the monomethylamine, 400 g. of dimethylamine were fed in per hour. The colourless reaction product, of which 1.2 liters were removed per hour, had an amine number of 184 after removal of lower amines. The distillation gave 90% by weight of distillable product with an amine number of 190. The NMR spectrographic investigation of the distillate showed a content of 48% of N-methyloctadecylamine and 52% of an N,N-dimethyloctadecylamine.

EXAMPLE III

Example I was repeated except that instead of stearic acid, 99.4% of lauric acid (1 liter=870 g. per hour) and instead of the zinc-aluminum oxide catalyst, 12 liters of the zinc-chromium oxide catalyst of preparation B were used. 1.2 liters per hour of water-white reaction product were removed. The product, freed from lower amine, had an amine number of 276. The distillation gave 89% by weight of distillable product with an amine number of 285. The NMR spectrographic investigation of the distillate showed a content of 93% of N-methyldodecylamine and 7% of N,N-dimethyldodecylamine.

EXAMPLE IV

Using the procedure and equipment of Example I, 1 liter (870 g.) of 99.4% lauric acid and 400 g. of dimethylamine of commercial quality were used per hour and 1.2 liters of colorless reaction product were removed per hour. The reaction product, freed from lower amines, had an amine number of 236. The distillation gave an 84% by weight distillable fraction with an amine number 253. The NMR spectrographic investigation of the distillate showed a content of 33% of N-methyldodecylamine and 67% of N,N-dimethyldodecylamine.

EXAMPLE V

In the hydrogenation apparatus of Example I, 0.5 liter of a mixture of stearic acid and methanol in the proportion of 1:2 by volume and 600 g. of ammonia, both preheated to 310° C., were fed per hour. The oven temperature was 310° C., the total pressure was 240 atmospheres, and the gas circulation was 385 liters per hour under pressure. 1.3 liters of water-white reaction product were removed per hour. The product, freed from lower amine, ammonia and methanol, had an amine number of 173 and gave on distillation 69% by weight of distillate with an amine number of 204. The NMR spectrographic investigation of the distillate showed a content of 58% of N-methyloctadecylamine and 42% of N,N-dimethyloctadecylamine.

EXAMPLE VI 1 liter (830 g.) of 84% azelaic acid and 900 g. of commercial methylamine, preheated jointly to 310° C., were fed into the hydrogenation apparatus of Example I. The oven temperature was 310° C., the total pressure was 240 atmospheres, and the gas circulation was 385 liters under pressure per hour. 1.3 liters of almost colorless reaction product were removed per hour. The product, freed from lower amine according to Example I, had an amine number of 555 and a distillable fraction of 79% by weight. The amine number of the distillate was 608. The NMR spectographic investigation of the distillate showed that 10% of the amino groups present were unsubstituted, 85% were monomethyl substituted and 5% were dimethyl substituted.

Various modifications of the process of the invention may be made without departing from the spirit or scope thereof.

I claim:

1. A process for the preparation of N-methyl-alkyl amines comprising hydrogenating an acid selected from the group consisting of aliphatic dicarboxylic acids and aliphatic mono-carboxylic acids of 4 to 24 carbon atoms at a temperature of 200 to 400° C. and a pressure of 50 to 400 atmospheres in the presence of an excess of at least one amine selected from the group consisting of monomethylamine and dimethylamine and methylamine formed in situ from methanol and ammonia and a metal oxide catalyst in lump form selected from the group consisting of zinc-aluminum oxide and zinc-chromium oxide catalysts.

2. The process of claim 1 wherein the excess of amine is less than 20 moles per carboxyl group to be reacted.

3. The process of claim 2 wherein the excess of amine is 2 to 5 moles per carboxyl group to be reacted.

4. The process of claim 1 wherein the acid is selected from the group consisting of saturated and unsaturated aliphatic monocarboxylic acids of 4 to 24 carbon atoms.

5. The process of claim 4 wherein the monocarboxylic acid is derived from natural fats.

6. The process of claim 1 wherein the amine is monomethyl amine.

7. The process of claim 1 wherein the amine is formed in situ from methanol and ammonia.

8. The process of claim 1 wherein the catalyst is zinc oxide-chromium oxide.

9. The process of claim 1 wherein the hydrogenation is effected at a temperature of 200 to 350° C. and a pressure of 100 to 300 atmospheres.

10. The process of claim 1 wherein the catalyst is zinc oxide-aluminum oxide.

References Cited

UNITED STATES PATENTS

| | | | |
|---|---|---|---|
| 2,071,301 | 2/1937 | Herold et al. | 260—585(B)X |
| 2,166,971 | 7/1939 | Schmidt et al. | 260—583(L) |
| 2,187,745 | 1/1940 | Lazier | 260—583(L)X |

CHARLES B. PARKER, Primary Examiner

R. L. RAYMOND, Assistant Examiner

U.S. Cl. X.R.

260—563, 570.9